(12) United States Patent
Aumann et al.

(10) Patent No.: US 10,237,154 B2
(45) Date of Patent: Mar. 19, 2019

(54) METHOD FOR ESTIMATING TIME ELAPSED BETWEEN USER SELECTION AND FIRST BIT RECEIPT FROM A SERVER

(71) Applicant: Cellos Software Ltd., Melbourne, VIC (AU)

(72) Inventors: Greg Aumann, Mitcham (AU); Amit Goel, Gurgaon Haryana (IN)

(73) Assignee: Cellos Software Ltd., Melbourne (AU)

( * ) Notice: Subject to any disclaimer, the term of this patent is extended or adjusted under 35 U.S.C. 154(b) by 402 days.

(21) Appl. No.: 14/973,954

(22) Filed: Dec. 18, 2015

(65) Prior Publication Data
US 2017/0180227 A1 Jun. 22, 2017

(51) Int. Cl.
*H04L 12/26* (2006.01)
*H04L 29/06* (2006.01)
*H04L 29/08* (2006.01)

(52) U.S. Cl.
CPC ...... *H04L 43/0852* (2013.01); *H04L 43/0888* (2013.01); *H04L 67/02* (2013.01); *H04L 69/28* (2013.01)

(58) Field of Classification Search
CPC . H04L 43/0852; H04L 67/02; H04L 43/0888; H04L 69/28
USPC ......................................................... 709/224
See application file for complete search history.

(56) References Cited

U.S. PATENT DOCUMENTS

| | | | |
|---|---|---|---|
| 6,411,998 B1* | 6/2002 | Bryant | H04L 29/06 370/216 |
| 7,289,454 B2 | 10/2007 | Bovo et al. | |
| 7,542,430 B2 | 6/2009 | Lin et al. | |
| 2011/0131334 A1* | 6/2011 | Takasu | H04W 76/02 709/227 |

* cited by examiner

*Primary Examiner* — Tu T Nguyen
(74) *Attorney, Agent, or Firm* — Shumaker, Loop & Kendrick, LLP

(57) ABSTRACT

The present invention relates to a network monitoring device and methods for estimating time elapsed between a user's first selection of an item or hyperlink on a web browser of a user device and a first bit received by the user device from a corresponding web server.

11 Claims, 10 Drawing Sheets

A-1: Calculating a first delay parameter based upon time elapsed between detections of a first request message from a user device and a first response message from a corresponding web server A-2: Calculating a second delay parameter based upon time elapsed between detections of the first response message and a second request message from the user device A-3: Calculating a third delay parameter based upon time elapsed between detections of the second request message and a second response message from the corresponding web server A-4: Estimating the time elapsed between the user's first selection on the web browser in the user device under control of the user to the first bit received by the user device from the corresponding web server in accordance with the first delay parameter, the second delay parameter and the third delay parameter

METHOD FOR ESTIMATING TIME ELAPSED BETWEEN USER SELECTION AND FIRST BIT RECEIPT FROM A SERVER

FIELD

The present invention relates to a network monitoring device and methods for estimating time elapsed between a user's first selection of an item or hyperlink on a web browser of a user device and a first bit received by the user device from a corresponding web server.

BACKGROUND

Currently, solution providers have proposed deployment of network monitoring devices to sniff packets on traffic flows of communication networks and perform analysis based on the sniffed packets. In existing proposals, the network monitoring device (NPM) usually has the following functions: (1) receiving packets from directional traffic flows on transmission links in a data network; (2) performing statistical data calculations on the received packets of traffic flows; (3) reporting calculated statistical data to external processing devices or systems, such as a customer experience management systems or a data analytics processing device. However, there are issues associated with these proposals which are explained below.

Although the NPM is intended to sniff and analyse packets in order to acquire statistical data of user traffic, communication network operators or data network operators are interested in knowing how end users (customers) of their networks perceive throughput (download throughput and/or upload throughput). For example, communication network operators or data network operators are eager to determine the time taken from a first click by the end user on a browser of the end user's smartphone until a first bit (or a first byte) is received from the corresponding server (via the operator network).

More particularly, wireless network operators may be interested to know how long it takes from the first selection of a webpage object (e.g., a universal resource locator (URL) or a hyperlink) on a browser on a smartphone by an end user (customer) until a first bit (or a first byte) is received from corresponding server (via the operator network).

Such time can be considered as user-perceived delay for smartphone or smart device applications in which information is requested from a server in Internet. For example, in a wireless communication network a user-perceived delay may be caused by several sources, such as wireless network delay while the request message travels to a wireless network gateway connected to Internet; Internet and other network delay while the request message travels to a corresponding server responsible for processing the request; processing time at the server while the requested information is retrieved by the server and transmitted to the user device in a response message; another Internet and other network delay while the response message travels back to the wireless network gateway from the corresponding server; another wireless network delay while the response message travels to the user device from the wireless network gateway, etc.

Due to the large number of smart devices and wireless communication devices continuously accessing the Internet, it is difficult to monitor the user-perceived delay on each device.

Against this background there is a need for a method, an apparatus or a system to efficiently and more accurately estimate time elapsed between a user's first selection on an item or hyperlink on a web browser in a user device under control of the user and a first bit received by the user device from a corresponding web server.

SUMMARY

According to an exemplary embodiment of the present disclosure, there is provided a method for estimating time elapsed between a user's first selection on a web browser of a user device under control of the user to a first bit received by the user device from a corresponding web server comprising:

calculating, by a network monitoring device, a first delay parameter based upon time elapsed between detections of a first request message and a first response message, wherein the first request message corresponds to the user's first selection on the web browser and the first response message is transmitted by the corresponding web server in response to the first request message received by the corresponding web server;

calculating, by the network monitoring device, a second delay parameter based upon time elapsed between detection of the first response message and a second request message, wherein the second request message is transmitted by the user device in response to the first response message received by the user device;

calculating, by the network monitoring device, a third delay parameter based upon time elapsed between detection of the second request message and a second response message which is transmitted by the corresponding web server in response to the second request message received by the corresponding web server; and estimating the time elapsed between the user's first selection on the web browser in the user device under control of the user to the first bit received by the user device from the corresponding web server in accordance with the first delay parameter, the second delay parameter and the third delay parameter.

The step of estimating the time elapsed between the user's first selection on the web browser in the user device under control of the user to the first bit received by the user device from a corresponding web server may comprise:

estimating the time elapsed between the user's first selection on the web browser in the user device under control of the user to the first bit received by the user device from a corresponding web server by adding the first delay parameter, twice the second delay parameter and the third delay parameter.

The step of calculating the first delay parameter may comprise:

monitoring, by the network monitoring device, one network equipment in a network for receipt of the first request message corresponding to the user's first selection on the web browser;

monitoring, by the network monitoring device, another network equipment in the network for receipt of the first response message, wherein the first response message is an acknowledgement message transmitted by the corresponding web server in response to receipt of the first request message;

calculating, by the network monitoring device, a first delay parameter based upon time elapsed between detection of the first request message and the first response message.

The step of calculating the second delay parameter may comprise:

monitoring, by the network monitoring device, the network equipment in the network for receipt of the second request message;

calculating, by the network monitoring device, the second delay parameter based upon time elapsed between detection of the first response message and the second request message.

The step of calculating the third delay parameter may comprise:

monitoring, by the network monitoring device, the another network equipment in the network for receipt of the second response message;

calculating, by the network monitoring device, a third delay parameter based upon time elapsed between detection of the second request message and the second response message.

The first request message may correspond to a transport control protocol (TCP) synchronization packet.

The first response message may correspond to an acknowledgement message at TCP layer transmitted by the corresponding web server in response to the first request message received by the corresponding web server.

The second request message may correspond to a Hypertext Transfer Protocol (HTTP) GET Request message.

The second response message may correspond to a Hypertext Transfer Protocol (HTTP) GET Response message, and the second response message may carry the first bit which is received by the user device.

The method may further comprise outputting, by the network monitoring device, to an external processing device the estimated time elapsed between the user's first selection on the web browser in the user device under control of the user to the first bit received by the user device from the corresponding web server.

According to another exemplary embodiment of the present invention, there is also provided another method for estimating time elapsed between a user's first selection on a web browser in a user device under control of the user to a first bit received by the user device from a corresponding web server comprising:

monitoring, by a network monitoring device, one network equipment in a network for receipt of a first request message corresponding to the user's first selection on the web browser;

monitoring, by the network monitoring device, another network equipment in the network for receipt of a first response message which is transmitted by the corresponding web server in response to the first request message;

monitoring, by the network monitoring device, the network equipment in the network for receipt of a second request message, which is transmitted by the user device in response to receipt of the first response message;

monitoring, by the network monitoring device, the another network equipment in the network for receipt of a second response message which is transmitted by the corresponding web server in response to the second request message;

calculating, by a network monitoring device, a first delay parameter D1, wherein the first delay parameter D1 is time elapsed between detections of the first request message and the first response message;

calculating, by the network monitoring device, a second delay parameter D2, wherein the second delay parameter D2 is time elapsed between detections of the first response message and the second request message;

calculating, by the network monitoring device, a third delay parameter D3, wherein the third delay parameter D3 is time elapsed between detections of the second request message and the second request message; and estimating the time, D5, elapsed between the user's first selection on the web browser in the user device under control of the user to the first bit received by the user device from the corresponding web server according to an expression (1):

$$D5=D1+D2\times 2+D3 \qquad \text{expression (1)}.$$

According to another exemplary embodiment of the present invention, there is provided a network monitoring device for estimating time elapsed between a user's first selection on a web browser in a user device under control of the user to a first bit received by the user device from a corresponding web server comprising:

a datagram monitor configured to monitor at least two network devices in a network for detecting messages;

a metrics calculator connected to the datagram monitor and configured to:

calculate a first delay parameter based upon time elapsed between detection of a first request message and a first response message, wherein the first request message corresponds to the user's first selection on the web browser and the first acknowledgement message is transmitted by the corresponding web server in response to the first request message received by the corresponding web server;

calculate a second delay parameter based upon time elapsed between detection of the first response message and a second request message, wherein the second request message is transmitted by the user device in response to the first response message received by the user device;

calculate a third delay parameter based upon time elapsed between detection of the second request message and a second response message which is transmitted by the corresponding web server in response to the second request message received by the corresponding web server; and estimate the time elapsed between the user's first selection on the web browser in the user device under control of the user to the first bit received by the user device from the corresponding web server in accordance with the first delay parameter, the second delay parameter and the third delay parameter.

The metrics calculator may be further configured to:

estimate the time elapsed between the user's first selection on the web browser in the user device under control of the user to the first bit received by the user device from a corresponding web server by adding the first delay parameter, twice the second delay parameter and the third delay parameter.

The datagram monitor may be further configured to:

monitor one network equipment in a network for receipt of the first request message corresponding to the user's first selection on the web browser;

monitor another network equipment in the network for receipt of the first response message, wherein the first response message is an acknowledgement message transmitted by the corresponding web server in response to receipt of the request message, and the metrics calculator may be further configured to calculate a first delay parameter based upon time elapsed between detection of the first request message and the first response message.

The datagram monitor may be further configured to monitor the network equipment in the network for receipt of the second request message; and the metrics calculator is further configured to calculate the second delay parameter based upon time elapsed between detection of the first response message and the second request message.

The datagram monitor may be further configured to monitor the other network equipment in the network for receipt of the second response message; and the metrics calculator may be further configured to calculate a third delay parameter based upon time elapsed between detection of the second request message and the second response message.

The network monitoring device may further comprise:

a metrics output connected to the metrics calculator and configured to output the estimated time elapsed between the user's first selection on the web browser in the user device under control of the user to the first bit received by the user device from the corresponding web server.

BRIEF DESCRIPTION OF THE DRAWINGS

Embodiments of the invention will now be described by way of example only with reference to the accompanying drawings, in which.

DETAILED DESCRIPTIONS OF EXEMPLARY EMBODIMENTS

Figure 1:
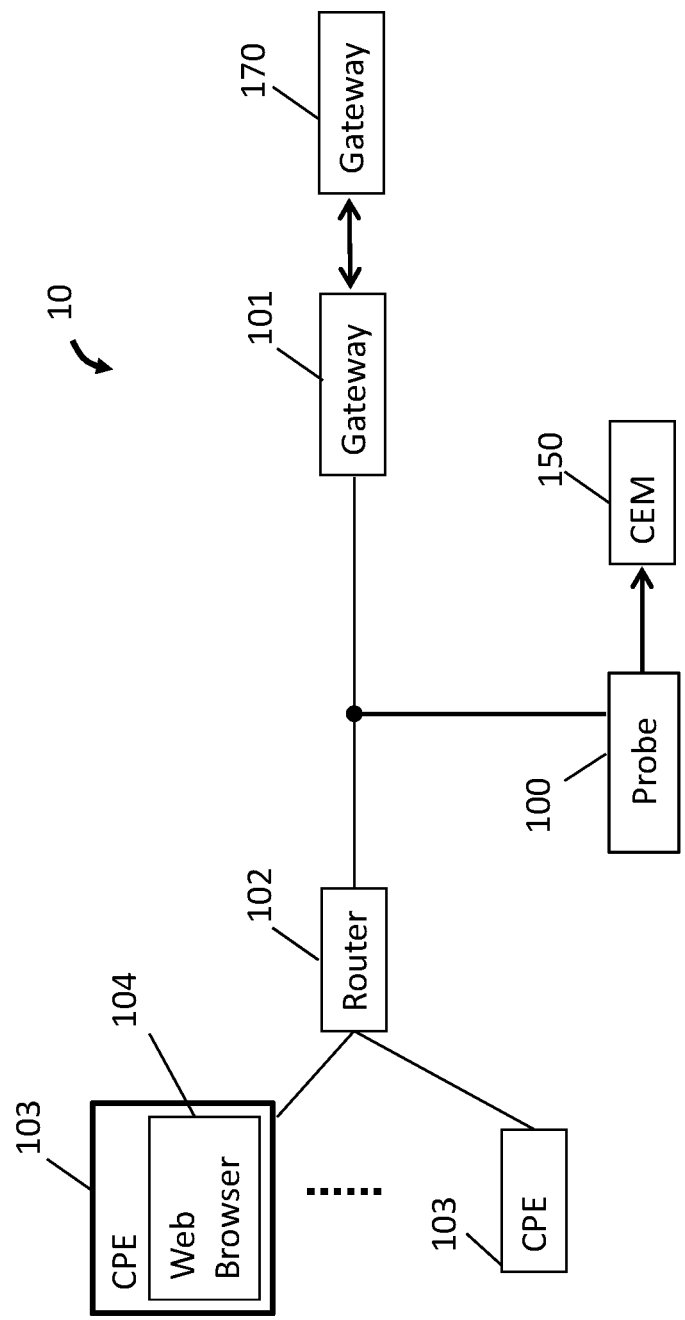
FIG. 1 illustrates architecture of an exemplary data network 10 according to an embodiment of the present invention.

In the following description, numerous specific details are set forth in order to provide a thorough understanding of various illustrative embodiments of the invention. However, it will be understood by those skilled in the art that embodiments of the invention may be practiced without some or all of these specific details. In other instances, well known process operations have not been described in detail so as to not unnecessarily obscure pertinent aspects of embodiments being described. In the drawings, like reference numerals refer to same or similar functionalities or features throughout the several views.

In order to address the problems or challenges faced by wireless communication network or data network operator in term of determining subscriber perspective or user-perspective throughput, the present disclosure provides a network monitoring device and related methods/approaches to estimate user-perceived delay in the wireless communication network or the data network by estimating time elapsed between a user's first selection on an item or hyperlink on a web browser in a user device under control of the user and a first bit received by the user device from a corresponding web server.

FIG. 1 illustrates architecture of an exemplary data network 10 according to an embodiment of the present invention. Referring to FIG. 1, a network monitoring device 100 (or a Multi-protocol probe, hereafter referred to as probe 100) connects to a link between a gateway 101 and an internal router 102. The Internal router 102 is further connected to a plurality of customer premise equipments (CPEs) 103 in the data network 10. For simplicity, only the CPEs 103 are shown in FIG. 1, however there may be multiple computing devices connected to the data network 10 through corresponding CPEs 103. Each CPE 103 is assigned at least one IP address. Some or all of the CPEs 103 may be computing devices in which there is disposed a web browser 104. For small business or a home business, a single IP address, whether static or dynamic, may be assigned to each CPE 103. For a large business, each CPE 103 may further connect to a cloud containing a plurality of servers, so each CPE 103 may be assigned a range of IP addresses, which may be referred to as "aggregated IP addresses". In the present disclosure, the CPE 103 represents a subscriber in the network 10. For simplicity, only one server 170 is shown in FIG. 1, and the server 170 may be a part of the network 10 or disposed in Internet which is external to the network 10.

The probe 100 transparently receives packets from a plurality of traffic flows directly associated with each CPE 103. It is noted that the probe 100 merely passively extracts copies of packets from the traffic flows in the data network 10, transparently processes the received packets and does not affect transmission of the packets in the data network 10. The probe 100 is further configured to generate statistical reports based on the received packets and send the generated reports to a customer experience management (CEM) system 150 external to the probe 100. In other embodiments, the CEM 150 can be replaced by other data analysis processing devices.

Figure 2:
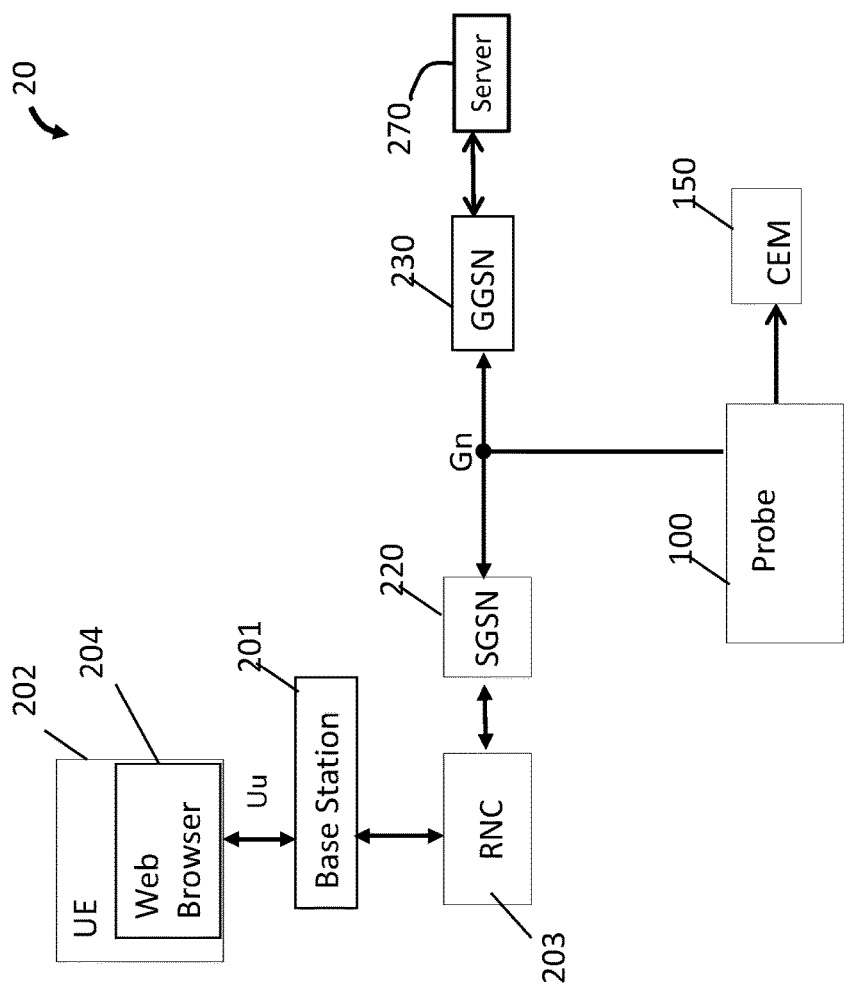
FIG. 2 illustrates architecture of an exemplary communication network 20 according to an embodiment of the present invention.

The invention may be applied to any data network using different communication protocol standards, e.g. Long Term Evolution (LTE) network, 3G network as defined in Third Generation Partnership Project (3GPP) Technical Specifications. In different data networks, the probe 100 may be deployed to sniff packets from a high speed link over different interfaces. For example, in the 3G network, the Probe 100 may be deployed to sniff packets from a high speed link over Gn interface as shown in FIG. 2. In another example, in the LTE network as shown in FIG. 3, the probe 100 may sniff traffic flows from LTE interfaces, for instance, LTE S1-U, S4, S11 and S12 interfaces over high speed links.

FIG. 2 illustrates architecture of an exemplary communication network 20 according to an embodiment of the present invention. Referring to FIG. 2, in a 3G network, the probe 100 may connect to a link between Serving GPRS Support Node (SGSN) 220 and Gateway GPRS Support Node (GGSN) 230 to extract traffic flows. The traffic flows originate from, or transmit to, a user equipment (UE) 202 which is connected with the SGSN 220 via a radio network controller (RNC) 203 and a base station 201. The UE 202 is connected to the base station 201 through an air interface Uu. The UE 202 receives packets from, and transmits packets to, the Internet via the GGSN 230. There is also a web browser 204 disposed in the UE 202. As shown in FIG. 2, the probe 100 may extract directional traffic flows from the Control-plane (C-Plane) and the User-Plane (U-Plane) via the Gn interface in the communication network 20, and then generate statistical reports based on packets received from the directional traffic flows and send the generated reports to a CEM system 150 external to the probe 100. In the present disclosure, the UE 202 or the user device represents a subscriber in the network 20. For simplicity, only one server 270 is shown in FIG. 2, and the server 270 may be part of the network 20 or disposed in Internet which is external to the network 20.

Figure 3:
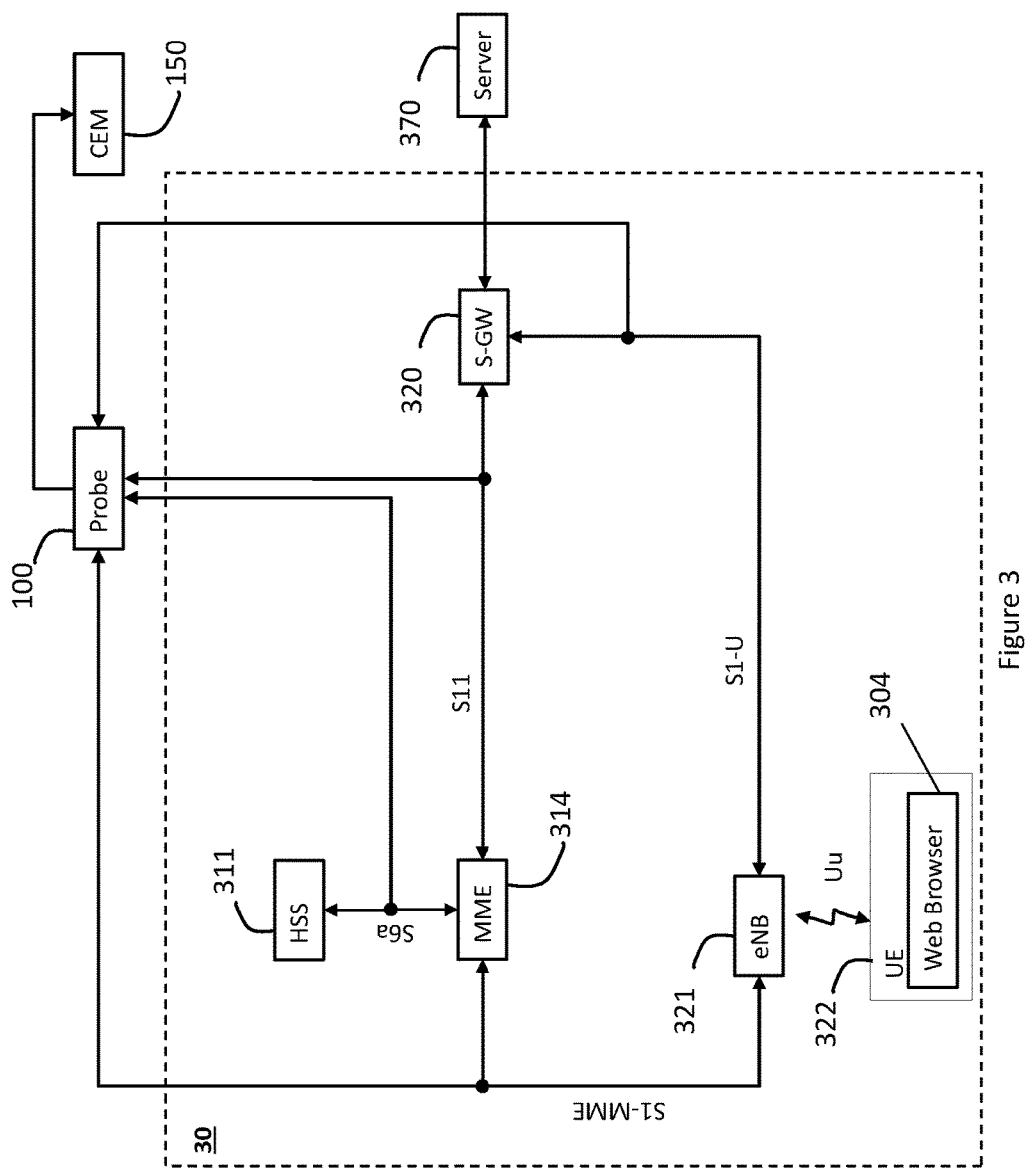
FIG. 3 illustrates architecture of an exemplary communication network 30 according to an embodiment of the present invention.

FIG. 3 illustrates architecture of an exemplary communication network 30 according to an embodiment of the present invention. Referring to FIG. 3, the probe 100 is configured to extract traffic flows from both the U-Plane and the C-Plane. The U-Plane traffic flows basically relate to Internet Protocol (IP) data packets transported between a UE 322 through the evolved NodeB (eNB) 321 and any servers in Cloud/Internet. Usually, the IP packets travel through high speed links between mobile devices/UEs and Cloud/Internet via Serving Gateway (S-GW)/Service General Packet Radio Service Support Node (SGSN) 320. The C-Plane traffic flows are related to control information, such as those transported between eNB 321 and Mobility Management Entity (MME) 314 for customers. There is also a web browser 304 disposed in the UE 322. As shown in FIG. 3, the probe 100 may connect to a S1-U interface between eNB 321 and S-GW/SGSN 320 to extract directional traffic flows from the U-Plane, and connect to a S1-MME between eNB 321 and MME 314 to extract directional traffic flows from the C-Plane. In some embodiments, the probe 100 is connected to extract traffic flows from C-Plane via other C-Plane interface, such as S6a interface between Home Subscriber Server (HSS) 311 and the MME 314. For simplicity, only one server 370 is shown in FIG. 3, and the server 370 may be part of the network 30, or disposed in Internet which is external to the network 30.

Prior to describing the operation of probe 100, the basic unit of statistical data collection, i.e. the traffic flow in the probe 100, is explained. In the present disclosure, three types of traffic flows are described when describing operations of probe 100. The concept of traffic flows is important to understand the U-Plane processing. Firstly, a directional Traffic Flow in Transmission Control Protocol/Internet Protocol (TCP/IP) networks is defined as: "a flow is a series of packets that share the same source and destination IP addresses, source and destination ports, and IP protocol. This is also called a five-tuple IP flow". The five-tuple may include: a source IP address; a source port number; a destination IP address; a destination port number; and an IP protocol.

Both source and destination addresses must be of the same type, i.e. IPv4 or IPv6 and the flow is directional. If the source and destination are swapped, it becomes a different flow. The IP protocol member specifies the Layer 4 protocol, e.g. TCP, UDP. In the present disclosure, the flow is also called a directional traffic flow.

In 3G/LTE networks, on U-Plane, the directional traffic flow may be characterised by five-tuple and Tunnel End Identifier (TEID) due to IP encapsulation used in tunneling of directional traffic flows. Directional traffic flows transmitted in different directions are assigned different TEIDs. In 3G/LTE networks, the TEID is 32 bits long.

In order to reliably detect application layer protocols, the probe 100 may use a deep packet inspection (DPI) engine to analyse traffic flows in both directions together. That is, the probe 100 analyses bi-directional traffic flows. In the present disclosure, analysis of traffic flows together in both directions is referred to as a "bi-directional traffic flow". A bi-directional traffic flow groups the two directional traffic flows corresponding to opposite directions together. That is to say, the source of one directional traffic flow corresponds to the destination of the other directional traffic flow in the opposite direction. The bi-directional traffic flow is specified by a five-tuple similar to the directional traffic flow, which may include: a lower IP address; a lower port number; an upper IP address; an upper port number; and a Layer 4 protocol.

In a bi-directional traffic flow, instead of a source and a destination address, the five-tuple includes a lower and an upper address. "Lower" refers to a numerically smaller value and upper refers to a numerically greater value. Lower port number refers to the port associated with the lower IP address and not the numerically lower port number.

Thus, suppose the source address is 192.168.1.17 port 2192 and the destination is 11.20.5.34 port 80, the lower IP address and port are 11.20.5.34 port 80 and the upper IP address and port are 192.168.1.17 port 2192. If the source is 11.20.5.34 port 80 and the destination is 192.168.1.17 port 2192 then the lower IP and port are still 11.20.5.34 port 80 and the upper IP address and port are still 192.168.1.17 port 2192. The five-tuple is the same regardless of the source and destination. Thus the direction of data transfer cannot be identified from the bi-directional traffic flow five-tuple. The meaning of the Layer 4 protocol field is the same as that of the IP protocol in the directional traffic flow five-tuple.

The real IP traffic traversing in the communication network and data network is related to application traffic flow(s) of end users/subscribers. The application traffic flow is a concept used in the statistical reports generated by the probe 100 and sent to, for example, the CEM 150 or an external data analysis processing device for further processing and analysis. An application traffic flow is specified by a three-tuple, which may include: an internal IP address; an external IP address; and an application ID (Identifier). The internal IP address is the IP address of the UE or the mobile phone and is internal to the operators network. The external address is external to the operator's network, most likely in the Internet. The application ID corresponds to the Layer 7 or application layer protocol, e.g. HTTP, IMAP, and so forth. This three-tuple is bi-directional similar to the five-tuple of a bi-directional flow. It is also similar in that the application ID generally identifies the destination port and the IP protocol, except when a server is using an unconventional port number for that application/protocol. Essentially, an application traffic flow is the aggregation of possibly multiple bi-directional traffic flows. For example, suppose a UE is connected to a website and has multiple pages open, there will be multiple bi-directional flows each with a different source port in the HTTP between that UE and the web server. In the present disclosure, an application traffic flow may refer to traffic flows from one UE with the same application protocol, or all traffic flows to a specific destination/application server belonging to a particular application protocol.

In order to calculate statistical data of an active traffic flow(s) such as throughput of a particular subscriber on U-Plane, the probe 100 receives IP packets from directional traffic flows on both C-Plane and U-Plane, generates statistical data for bi-directional traffic flows and then uses the generated statistical data and other related identification information extracted from the bi-directional traffic flows to calculate the statistical data of a particular application traffic flow/particular directional traffic flow on U-Plane. The probe 100 may further use the identifier information obtained from C-Plane such as Fully Qualified Tunnel End Identifier (FTEID), International Mobile Subscriber Identity (IMSI) or Globally Unique Temporary ID (GUTI) to correlate statistical data of a particular application traffic flow/particular directional traffic flow with a subscriber in the data network. After the probe 100 calculates the statistical data of traffic flows corresponding to a large number of customers/subscribers, the calculated statistical data are output or transferred from the probe 100 to the CEM 150 as shown in FIGS. 1-4.

Figure 4:
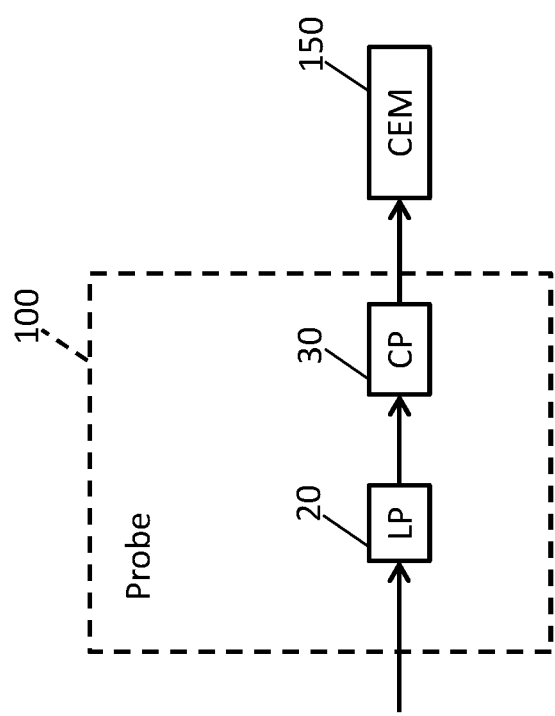
FIG. 4 shows major processing elements in a probe 100 according to an embodiment of the present invention.

FIG. 4 shows major processing elements in a probe 100 according to an embodiment of the present invention. The process of statistical calculation in the probe 100 may be explained with reference to FIG. 4. As shown in FIG. 4, the probe 100 may include a link processor (LP) 20 connected to a correlation processor (CP) 30. In another embodiment, the probe 100 may include more than one LP 20 connected to the CP 30. When a plurality of LPs 20 are used to process incoming traffic flows, the LPs work in parallel to extract directional traffic flows, and apply detection on Internet Protocol (IP) packets on each directional traffic flow in order to extract information from the IP packets.

In order to calculate statistical data of all directional traffic flows or application traffic flows from one UE belonging to a particular application protocol, e.g. HTTP, FTP etc, the probe 100 may use the DPI engine operating in the LP 20 to obtain application layer protocol of the received packets in bi-directional traffic flows. The application layer protocol has unique Application ID in the three-tuple definition of the application traffic flow.

Before each request-response message/packet for any application traffic flow occurs on U-Plane, there may be at least one or some control signalling or control messages transferred on C-Plane, and the LP 20 of the Probe 100 may extract customer/subscriber information thereon, such as FTEID, IMSI, GUTI, eNB-UE-S1APID, MME-UE-S1APID and so forth. Thus, the CP 30 receiving output from LPs 20 will further correlate the application traffic flows with the customer/subscriber information in the control signalling or control messages. Subsequently, the CP generates a traffic flow statistical data report regarding individual customer(s)/subscriber(s) and transmits the report to the CEM 150 or an external data processing analysis device.

According to an embodiment of the invention, each LP 20 in the probe 100 reports statistical data of a bi-directional traffic flow in a preconfigured data structure to the CP 30. Each data structure is a nested structure and may include at least the following pre-configured information: an upper IP address; a lower IP address; an upper port number; a lower port number; an Application ID; a downlink statistical data structure; and an uplink statistical data structure.

The downlink statistical data structure for one bi-directional traffic flow includes at least the following information: "Number of bytes" received from the downlink traffic flow; "Number of packets" received from the downlink traffic flow; "Active Second Vector" for current report period, which is configured to record the active seconds of downlink traffic flow within the current reporting period; "Period Octet Vector" for current report period, which is configured to accumulate and store statistical data of the downlink traffic flow within the current reporting period, e.g. the number of bytes and the number of packets transferred in the downlink traffic flow; FTEID of the directional traffic flow. In 3G/LTE networks, FTEID includes TEID and Layer 3 IP address of GTP packets. This Layer 3 IP address is only for routing encapsulated IP packets inside the LTE network.

The uplink statistical data structure for the same bi-directional traffic flow includes at least the following information: "Number of bytes" received from the uplink traffic flow; "Number of packets" received from the uplink traffic flow; "Active Second Vector" for current report period, which is configured to record the active seconds of uplink traffic flow within the current reporting period; "Period Octet Vector" for current report period, which is configured to accumulate and store statistical data of the uplink traffic flow within the current reporting period, e.g. the number of bytes and the number of packets transferred in the uplink traffic flow; FTEID of the directional traffic flow.

Figure 5:
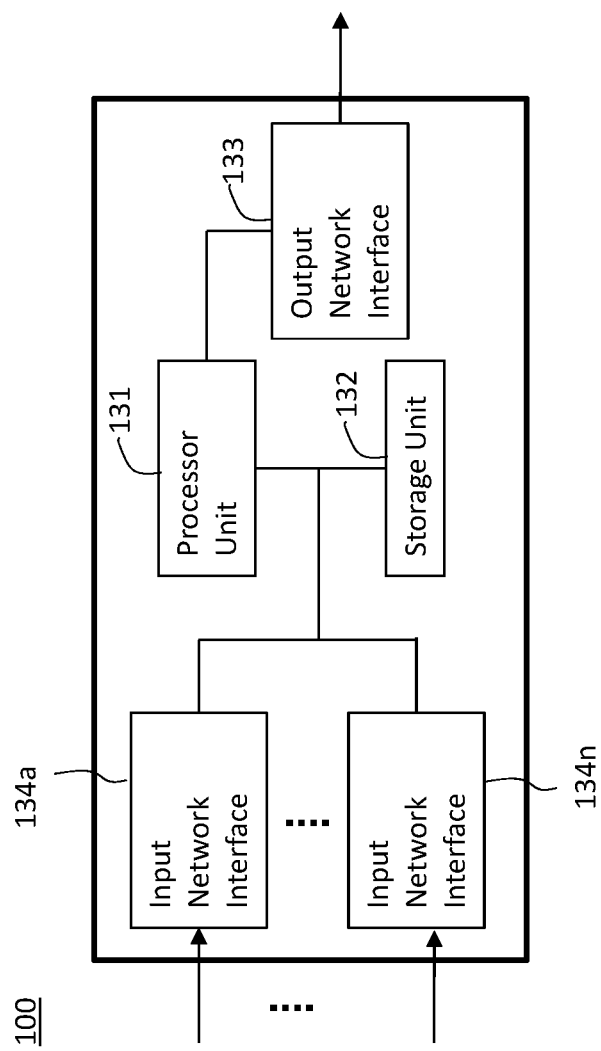
FIG. 5 is a schematic diagram of physical components of the monitoring probe 100.

FIG. 5 is a schematic diagram of the physical components of the probe 100. The probe 100 includes a processor unit 131, a storage unit 132, an output network interface 133, and one or more input network interfaces 134a . . . 134n. It is envisaged that the probe 100 will typically include more than one input network interface 134. However, those skilled in the art will appreciate that the probe 100 may include only one input network interface 134. For example, in one embodiment where the monitoring probe 100 is configured to only monitor for the control plane messages transmitted from the eNB 321 to the MME 314 on the S1-MME interface, the probe 100 may have only one input network interface 134.

Each of the input network interfaces 134a . . . 134n is connected to a respective one of the eNB 321, MME 314, HSS 311 and S-GW 320 on a high-speed link. The processor unit 131 is configured to implement (or execute) a number of software modules based on program code and/or data stored in the storage unit 132. The storage unit 132 stores program code for implementing software modules for identifying a user plane identifier of the UE 202/UE 322 and also correlate the control plane identifier and the user plane identifier of the UE 202/UE 322.

Figure 6:
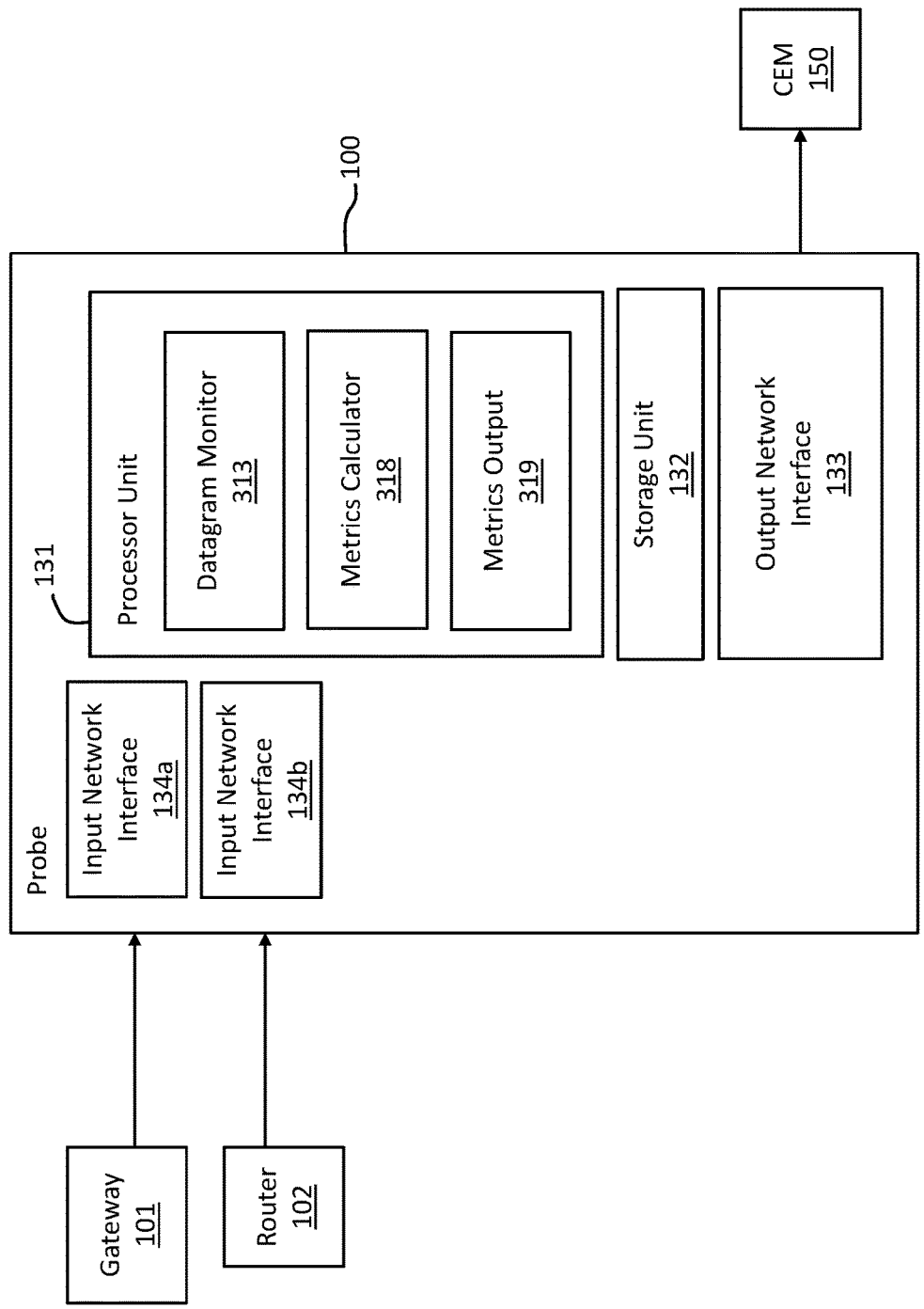
FIG. 6 is a schematic diagram of the functional components of the network monitoring device 100 for estimating user-perceived delay for one of CPEs 103 in the data network 10.

FIG. 6 is a schematic diagram of the functional components of the monitoring probe 100 for estimating user-perceived delay for a CPE 103 in the data network 10. In this embodiment, the functional components are software modules implemented by the processor unit 131 of the probe 100. However, persons skilled in the art will appreciate that one or more of the functional components could alternatively be implemented in some other way, for example, by one or more dedicated circuits.

One of the software modules implemented by the processor unit 131 is a datagram monitor 313. The datagram monitor 313 is adapted to monitor one or more of the network devices of the data network 10 for receipt of at least control plane messages and/or user plane data packets. For example, the datagram monitor 313 may be part of the LP 20. Each of the control plane messages/user plane data packets comprises at least one control plane identifier. At least one of the control plane messages/user plane data packets comprises at least one user device identifier, and at least another one of the control plane messages comprises at least one user plane identifier. For example, the datagram monitor 313 may be configured to detect the type of messages received from the network 10.

Referring to FIG. 6, the processor unit 131 is electrically connected to at least one Input Network Interface 134a, 134b. In some embodiments, the processor unit 131 is electrically connected to Input Network Interfaces 134a-134b. Also, the processor unit 131 is connected to the storage unit 132 and the output network interface 133. The datagram monitor 313 monitors a gateway 101 and a router 102 for receipt of control plane messages or user plane data packets. Other software modules implemented by the processor unit 131 are a metrics calculator 318 and a metrics output 319. The metrics calculator 318 analyses the IP packets received on traffic flows corresponding to each subscriber in the data network 10, calculates throughput of each subscriber over preconfigured monitoring period, and then outputs the calculated throughput of each subscriber through the metrics output 319 (via the output network interface 133) to the CEM 150 or another data analysis processing device. For example, the metrics calculator 318 and the metrics output 319 may be a part of the LP 30. In another example, the metrics calculator 318 may be configured to calculate time elapsed between a first message and a second message subsequent to the first message received by the datagram monitor 313.

Figure 7:
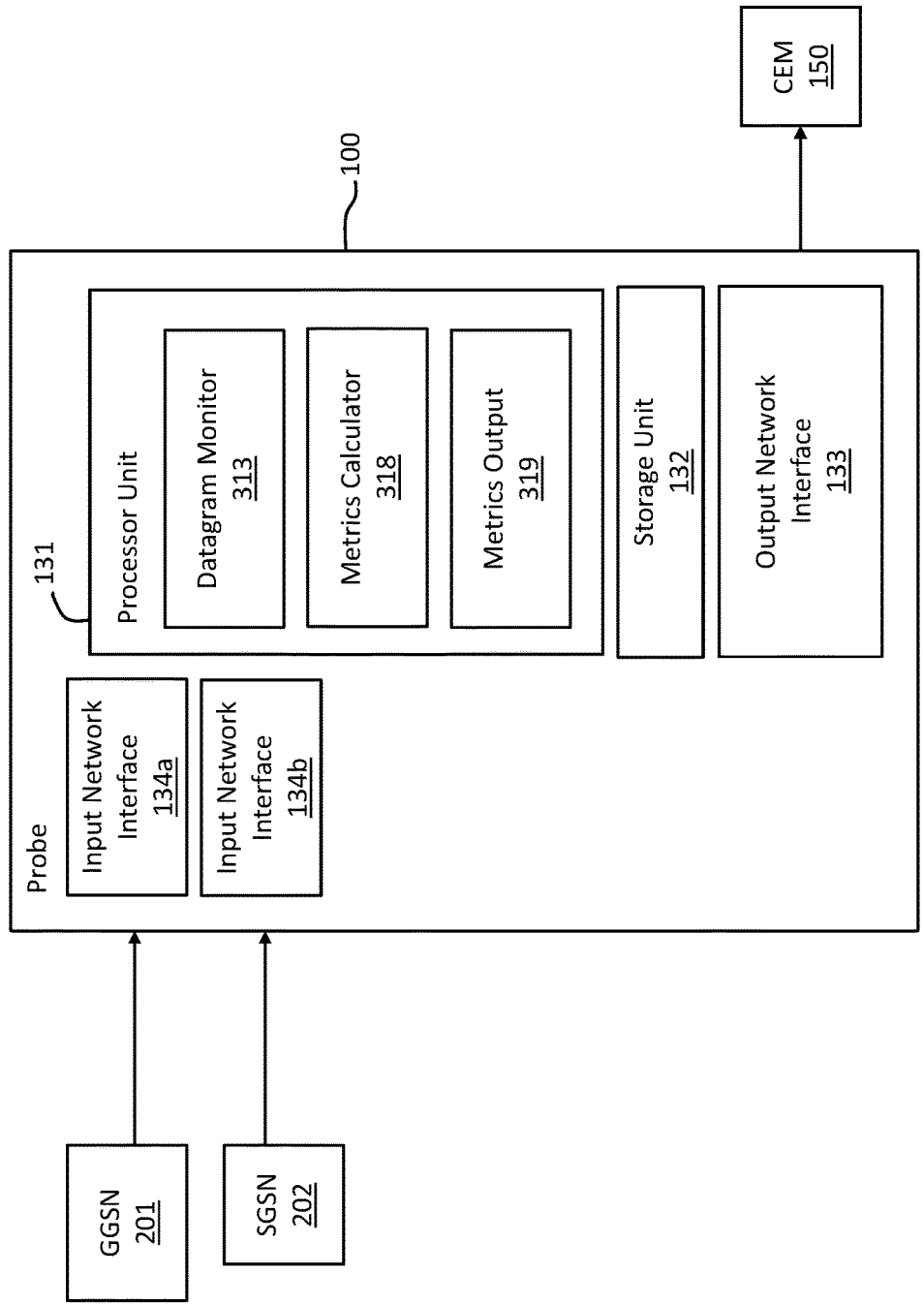
FIG. 7 is a schematic diagram of the functional components of the monitoring probe 100 for estimating user-perceived delay for one of CPEs 103 in the data network 20.

FIG. 7 is a schematic diagram of the functional components of the probe 100 for estimating user-perceived delay for a user device in the communication network 20. In this embodiment, the functional components are software modules implemented by the processor unit 131 of the probe 100. However, those skilled in the art will appreciate that one or more of the functional components could alternatively be implemented in some other way, for example, by one or more dedicated electronic circuits.

The datagram monitor 313 is adapted to monitor one or more of the network devices of the communication network 20 for receipt of at least control plane messages and/or user plane data packet. Each of the control plane messages/user plane data packets comprises at least one control plane identifier. At least one of the control plane messages/user plane data packets comprises at least one user device identifier, and at least another one of the control plane messages comprises at least one user plane identifier. For example, the datagram monitor 313 may be a part of the LP 20. For example, the datagram monitor 313 may be configured to detect the type of messages received from the network 20.

Referring to FIG. 7, the processor unit 131 is electrically connected to at least one Input Network Interfaces 134a, 134b. In some embodiments, the processor unit 131 is electrically connected to Input Network Interfaces 134a-134b. Also, the processor unit 131 is connected to the storage unit 132 and the output network interface 133. The datagram monitor 313 monitors the GGSN 201 and the SGSN 202 for receipt of control plane messages or user plane data packets. The metrics calculator 318 analyses the IP packets received on traffic flows corresponding to each subscriber in the communication network 20, calculates throughput of each subscriber over a preconfigured monitoring period, and then outputs the calculated throughput of each subscriber through metrics output 319 (via the output network interface 133) to the CEM 150 or another data analysis processing device. For example, the metrics calculator 318 and the metrics output 319 may be a part of the LP 30. In another example, the metrics calculator 318 may be configured to calculate time elapsed between a first message and a second message subsequent to the first message received by the datagram monitor 313.

Figure 8:
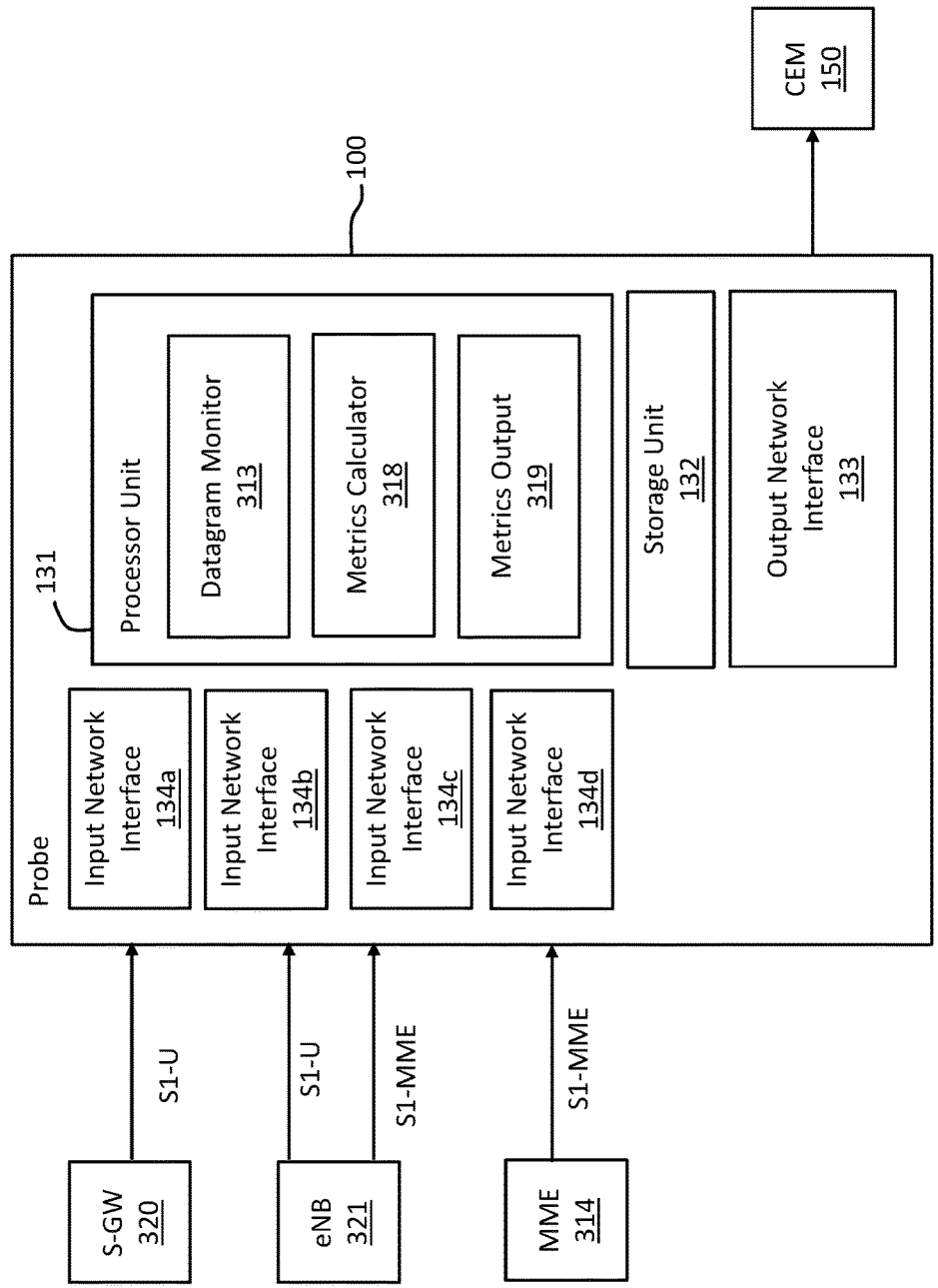
FIG. 8 is a schematic diagram of the functional components of the monitoring probe 100 for estimating user-perceived delay for one of CPEs 103 in the data network 30.

FIG. 8 is a schematic diagram of the functional components of the probe 100 for estimating user-perceived delay for a user device in the communication network 30. In this embodiment, the functional components are software modules implemented by the processor unit 131 of the probe 100. However, those skilled in the art will appreciate that one or more of the functional components could alternatively be implemented in some other way, for example, by one or more dedicated circuits.

The datagram monitor 313 is adapted to monitor one or more of the network devices of the communication network 30 for receipt of at least control plane messages and/or user plane data packets. Each of the control plane messages/user plane data packets comprises at least one control plane identifier. At least one of the control plane messages/user plane data packets comprises at least one user device identifier, and at least another one of the control plane messages comprises at least one user plane identifier. For example, the datagram monitor 313 may be part of the LP 20. For example, the datagram monitor 313 may be configured to detect the type of messages received from the network 30.

Referring to FIG. 8, the processor unit 131 is electrically connected to at least Input Network Interfaces 134a, 134b, 134c, 134d in order to monitor control plane messages or user plane data packets coming from the S-GW 320, the eNB 321 and MME 314 via the Input Network Interfaces 134a, 134b, 134c, 134d respectively. In some embodiments, the processor unit 131 is connected to Input Network Interfaces 134a-134b for monitoring user plane data packets coming from the S-GW 320 and the eNB 321. Also, the processor unit 131 is connected to the storage unit 132 and the output network interface 133. The datagram monitor 313 monitors the eNB 321 and the MME 314 for receipt of control plane messages or user plane data packets. The metrics calculator 318 analyses the IP packets received on traffic flows corresponding to each subscriber in the communication network 30, calculates throughput of each subscriber over preconfigured monitoring period, and then outputs the calculated throughput of each subscriber through metrics output 319 (via the output network interface 133) to the CEM 150 or another data analysis processing device. For example, the metrics calculator 318 and the metrics output 319 may be a part of the LP 30. For another example, the metrics calculator 318 may be configured to calculate time elapsed between a first message and a second message subsequent to the first message received by the datagram monitor 313.

The probe 100 shown in FIGS. 1 to 8 is proposed to estimate time elapsed from an end user's first selection command in a web browser of the user device under control of the end user to a first bit or a first byte received from a corresponding web server, e.g., the servers 170, 270, 370. For example, the probe 100 can be deployed in a wireless communication network or a data network for sniffing user plane data packets or control plane messages or signaling. For example, FIG. 3 illustrates the probe 100 deployed in a LTE network where control plane messages may be extracted over S1-MME, S11, S6a interface; the user plane data packets may be extracted over S1-U interface between the eNB 321 and the S-GW 320. Therefore, the user data transmissions in uplink and downlink can be easily detected for UEs connected to the eNB 321.

In another example, the probe 100 can be deployed in a 3G network, e.g., the network 20, to sniff user data packets over Gn interface and sniff packet for application flow corresponding to any UE in the operator network. However, as can be seen in FIG. 9 below, for an application flow of a UE, Internet delay or Radio Delay, the Application Response Time should be accurately measured.

Figure 9:
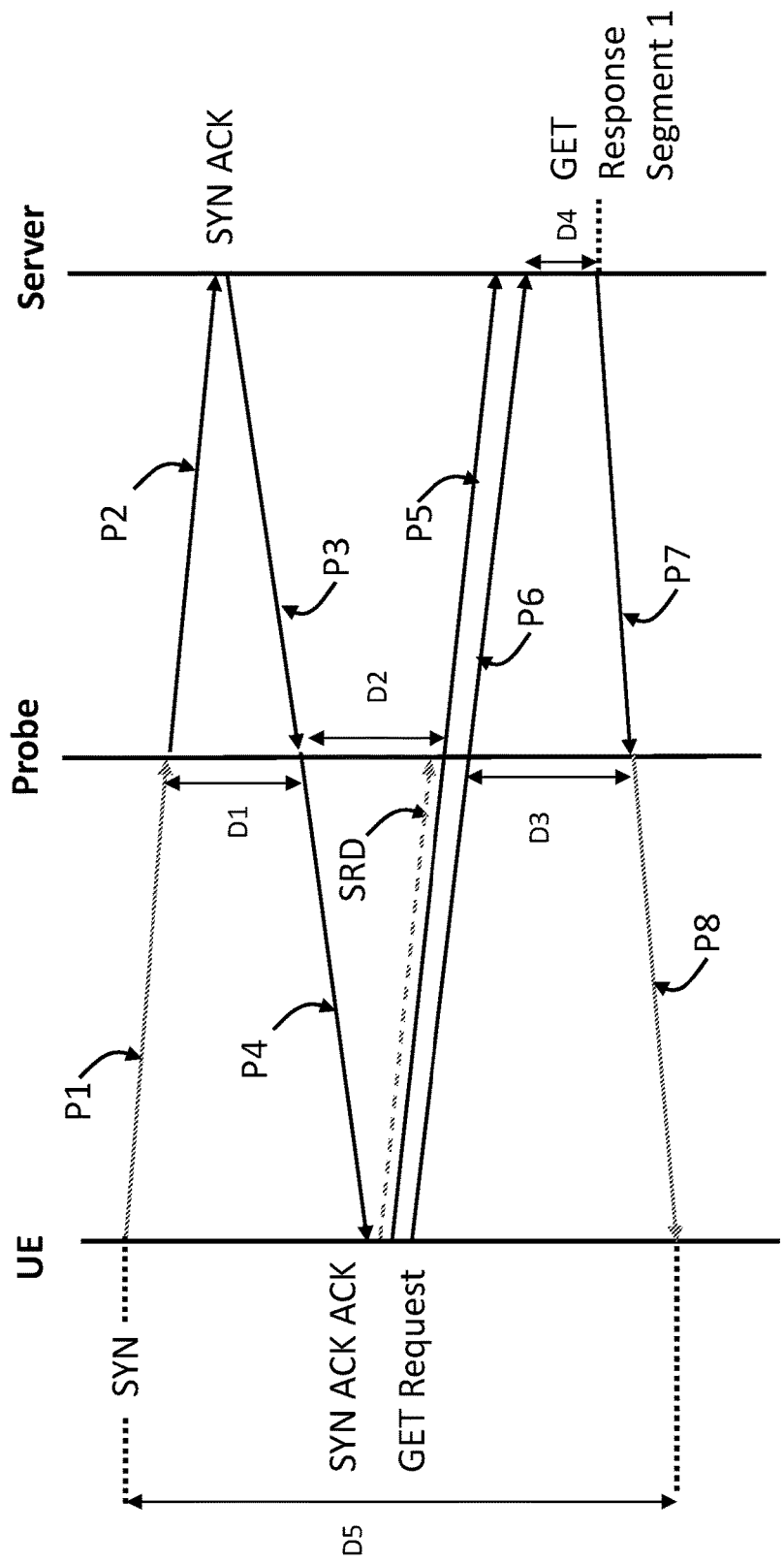
FIG. 9 is a simplified diagram illustrating message sequence flow according to an embodiment of the invention.

FIG. 9 is a simplified diagram illustrating message sequence flow according to an embodiment of the invention. FIG. 9 illustrates message transmissions P1, P2, P5, P6 originating from a UE (or a CPE) monitored by probe 100 to a corresponding server 170, 270, 370, or message transmissions P3, P4, P7, P8 originating from the corresponding server 170, 270, 370 to the UE (or the CPE). The user-perceived delay, which is defined as time elapsed from a first selection of a webpage object by the end user on the UE (or the CPE) to the first bit or first byte received by the UE (or the CPE), is illustrated by time D5.

Currently, probe 100 can directly measure time durations D1, D2 and D3, but cannot directly measure the time taken for the message transmission path along P1 and P8. By close monitoring of messages transmitted from, and received by, the UE (or the CPE), and also by close monitoring of messages responded to by the corresponding server in Internet, it is observed that when an end user requests to download a web page after the universal resource locator (URL) is input or simply by clicking a hyperlink in another web page, the first message transmitted from the smartphone or the smart device is a synchronization packet (SYN). The first packet sent across a TCP connection is known as a SYN packet. For example, when the end user enters "http://www.cellossoftware.com" on the web browser, the first IP packet transmitted from the user device could be a SYN packet to the HTTP port on a web server responsible for the URL of "www.cellossoftware.com". In this case, the browser on the user device attempts to notify the corresponding web server that the user device wants to connect with the web server.

The transmission from the user device (e.g, smartphone or computing device) to a corresponding server in Internet is depicted by transmissions P1 and P2 in FIG. 9. When probe 100 is deployed in a wireless communication network, it may be connected to a user interface such as S1-U interface connected to S-GW 320, and then the S-GW 320 further connects to the Internet. Probe 100 can record the time T1 (according to timestamp assigned by network interface card or the input network interface 134) when the SYN packet is detected.

In response to the SYN packet received from the user device, the corresponding server in Internet may transmit a SYN ACK packet to the user device. The transmission of the SYN ACK packet is depicted by transmissions P3 and P4 in FIG. 9. Probe 100 may record time T2(according to timestamp assigned by network interface card or the input network interface 134) when the SYN ACK packet from the corresponding server is detected.

In the present context, the time difference between the T1 and T2 is Internet Delay, and the Internet Delay is depicted by D1 in FIG. 9. Alternatively, D1 may be interpreted as the time elapsed between detections of a synchronization message and a corresponding synchronization acknowledgement message at probe 100.

In response to the SYN ACK packet received from the corresponding server, the user device consecutively transmits SYN ACK ACK packet (whose transmission depicted as a transmission P5 in FIG. 9) and then a GET request packet containing a request message (depicted as a transmission P6 in FIG. 9). Probe 100 can record time T3 (according to timestamp assigned by network interface card or the input network interface 134) when the SYN ACK ACK packet and the GET request packet is detected. The above-mentioned SYN message, SYN ACK message, SYN ACK ACK messages correspond to TCP layer (transport layer) messages.

The time difference between T2 and T3 may be called a Radio Delay if probe 100 is deployed in a wireless communication network. The Radio Delay is a wireless network delay between a gateway of the wireless network and the user device. The Radio Delay is depicted by D2 in FIG. 9. Alternatively, D2 may be interpreted as the time elapsed between detections of the synchronization acknowledgement message and a GET request message (carried by GET request packet) at the probe 100.

In response to the SYN ACK ACK packet and GET request packet received from the user device, the corresponding server processes the request message and provides a segment 1 (the first segment) of the requested web content in a GET response packet (containing a GET response message carrying the segment 1) to the user device. The transmissions of the GET response packet (containing the response message carrying the segment 1) are depicted by transmissions P7 and P8. Probe 100 can record time T4 (according to timestamp assigned by network interface card or the input network interface 134) when the GET response packet corresponding to the user device is detected. The above-mentioned GET request message and GET response message are corresponding to HTTP layer (application layer) messages.

The time difference between the T3 and T4 may be referred to as Application Response Time. The Application Response Time is Internet Delay plus Server processing time (depicted by D4) of the corresponding server, and the Application Response Time is depicted by D3 in FIG. 9. Alternatively, D3 may be interpreted as the time elapsed between detections of the GET request message and a GET request message (containing GET response segment 1) by probe 100.

However, probe 100 cannot directly measure the time taken for the transmissions P1 and P8. By close monitoring of the packet traversing in the wireless communication network it is observed that time taken from the gateway of the network to the user device over the transmission P4 is similar to time taken from the gateway of the network to the user device over the transmission P8. Also, the time (depicted by a single trip radio delay, SRD in FIG. 9) taken for the SYN ACK ACK message or the GET request message from the user device to arrive at the gateway of the network is similar to the time taken for SYN message transmitted from the user device to the S-GW over transmission P1.

Since the radio delay, D2, can represent the time taken for transmissions SRD and P4, it is proposed to estimate the time "from first click to first bit received" as D1+D2*2+D3. That is, D5, as time elapsed between the user's first selection on the web browser in the user device under control of the user to the first bit received by the user device from the corresponding web server, may be estimated according to an equation (1) below:

$$D5=D1+D2\times 2+D3 \qquad \text{Equation (1),}$$

wherein, the first delay parameter D1 is time elapsed between detections of the first request message and the first response message; the second delay parameter D2 is time elapsed between detections of the first response message and the second request message; the third delay parameter D3 is time elapsed between detections of the second request message and the second request message.

In equation (1), D1 may be called the Internet Delay; D2 may be called the radio delay; D3 may be called the Application response delay; and D5 is the total amount of time from a first click (a first selection command on web browser of the user device) by the end user to a first bit downloaded/received by the user device (from the corresponding server).

According to measurements in live wireless communication networks the proposed method can accurately estimate time "from first click to first bit received", based on what the probe can directly measure. The proposed method can efficiently provide the estimated delay from first click to first bit received.

Figure 10:
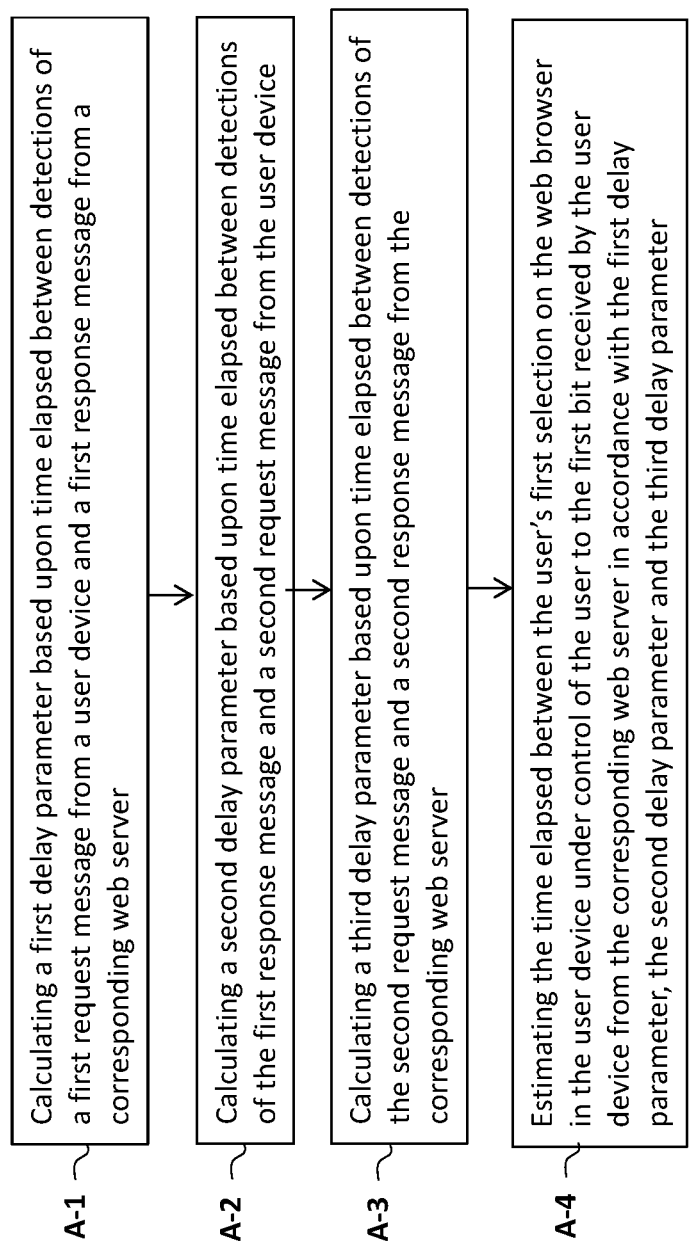
FIG. 10 is a flowchart illustrating a method for estimating time elapsed between a user's first selection in a web browser of a user device under control of the user to a first bit received by the user device from a corresponding web server according to an embodiment of the invention.

FIG. 10 is flowchart illustrating a method for estimating time elapsed between a user's first selection on a web browser in a user device under control of the user to a first bit received by the user device from a corresponding web server. Referring to FIG. 6 to FIG. 10, the method of for estimating a user-perceived network may include the following steps A-1 to A-4, and can be applied to any of communication networks 10, 20 or 30.

At step A-1, the metrics calculator 318 of probe 100 is configured to calculate a first delay parameter (i.e., the first delay parameter D1) based upon time elapsed between detections of a first request message (e.g., the SYN packet transmitted from the user device/CPE to the corresponding server) and a first response message (e.g., the SYN ACK packet transmitted from the corresponding server to the user device/CPE). The first request message corresponds to the user's first selection on the web browser, and the first response message is an acknowledgement message transmitted by the corresponding web server in response to the first request message received by the corresponding web server.

At step A-1, datagram monitor 313 of probe 100 first monitors one network equipment (e.g, a router 102, a SGSN 220 or an eNB 321) in a network 10, 20 or 30 for receipt of the first request message corresponding to the user's first selection on the web browser. Then, at the same step A-1, probe 100 continues to monitor the other network equipment (e.g., a gateway 101, a GGSN 230, a S-GW 320) in the network 10, 20 or 30 or in the wireless communication network for receipt of the first response message, where the first response message is an acknowledgement message transmitted by the corresponding web server in response to receipt of the first request message. Subsequently, metrics calculator 318 of probe 100 receives the time instants of detecting the first request message and the first response message from datagram monitor 313, and is configured to calculate the first delay parameter D1 based upon time elapsed between detections of the first request message and the first response message.

The first request message corresponds to a transport control protocol (TCP) synchronization packet. The first response message is an acknowledgement message at TCP layer transmitted by the corresponding web server in response to the first request message received by the corresponding web server. Additionally, datagram monitor 313 of probe 100 obtains time instants of messages assigned by the input network interface 134a and/or 134b which are implemented as network interface cards.

At step A-2, metrics calculator 318 is configured to calculate a second delay parameter (i.e., the second delay parameter D2) based upon time elapsed between detections of the first response message and a second request message (e.g., a GET Request message), where the second request message is transmitted by the user device in response to the first response message received by the user device.

At step A-2, datagram monitor 313 firstly monitors the network equipment (e.g., the router 102, the SGSN 220 or the eNB 321) in the network 10, 20 or 30 for receipt of the second request message. Then, at the same step A-2, metrics calculator 318 is configured to receive the time instants of detecting the first response message and the second request message from datagram monitor 313, and configured to calculate the second delay parameter D2 based upon time elapsed between detections of the first response message and the second request message. Additionally, the second request message is a Hypertext Transfer Protocol (HTTP) GET Request message.

At step A-3, metrics calculator 318 is configured to calculate a third delay parameter (i.e., the third delay parameter D3) based upon time elapsed between detections of the second request message and a second response message (e.g., GET Response message) which is transmitted by the corresponding web server in response to the second request message received by the corresponding web server. The second response message is a Hypertext Transfer Protocol (HTTP) GET Response message, and the second response message carries the first bit which is received by the user device.

At step A-3, datagram monitor 313 firstly monitors the other network equipment (e.g., a gateway 101, a GGSN 230, a S-GW 320) in the network 10, 20 or 30 for receipt of the second response message. Then, at the same step A-3, metrics calculator 318 is configured to receive the time instants of detecting the second response message and the second request message from datagram monitor 313, and configured to calculate a third delay parameter based upon time elapsed between detections of the second request message and the second response message.

At step A-4, metrics calculator 318 is further configured to estimate the time elapsed between the user's first selection on the web browser in the user device under control of the user to the first bit received by the user device from a corresponding web server according to the first delay parameter D1, the second delay parameter D2 and the third delay parameter D3. In particular, metrics calculator 318 estimates the time elapsed between the user's first selection on the web browser in the user device under control of the user to the first bit received by the user device from a corresponding web server by adding the first delay parameter D1, twice the second delay parameter D2 and the third delay parameter D3. That is, metrics calculator 318 estimates the user-perceived delay D5 according to equation (1).

At step A-4, metrics output 319 of probe 100 is configured to output an external processing device the estimated time elapsed between the user's first selection on the web browser in the user device under control of the user to the first bit received by the user device from the corresponding web server. The external processing device can be a CEM 150 or a customer data analysis device (not shown).

The preceding exemplary embodiments of the present invention may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by or in connection with an instruction execution system, apparatus, or device, such as a network monitoring device shown in FIGS. 5 to 8. A computer-readable medium may include a computer-readable storage medium (e.g., a physical device) that may be any media or means that can carry or store the instructions for use by or in connection with a system, apparatus, or device, such as a computer or a communication device. For instance, the storage unit 132 may include the computer-readable medium which may include computer program code, when executed by the processor unit 131, may cause the network monitoring device and related methods/approaches to estimate user-perceived delay in the communication network or the data network by performing procedures/steps illustrated in FIG. 10.

Further aspects of the network monitoring probe 100 will be apparent from the above description of the network monitoring probe 100. Persons skilled in the art will also appreciate that any of the methods described above could be embodied in program code. The program code could be supplied in a number of ways, for example on a tangible computer readable medium, such as a disc or a memory or as a data signal.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method for estimating time elapsed between a user's first selection on a web browser of a user device under control of the user to a first bit received by the user device from a corresponding web server comprising:
    calculating, by a network monitoring device, a first delay parameter based upon time elapsed between detection of a first request message and a first response message, wherein the first request message corresponds to the user's first selection on the web browser, wherein the first request message corresponds to a transport control protocol (TCP) synchronization packet and the first response message is transmitted by the corresponding web server in response to the first request message received by the corresponding web server, wherein the first response message corresponds to an acknowledgement message at TCP layer transmitted by the corresponding web server in response to the first request message received by the corresponding web server;
    calculating, by the network monitoring device, a second delay parameter based upon time elapsed between detection of the first response message and a second request message, wherein the second request message is transmitted by the user device in response to the first response message received by the user device, wherein the second request message corresponds to a Hypertext Transfer Protocol (HTTP) GET Request message;
    calculating, by the network monitoring device, a third delay parameter based upon time elapsed between detection of the second request message and a second response message, wherein the second response message is transmitted by the corresponding web server in response to the second request message received by the corresponding web server, wherein the second response message corresponds to a Hypertext Transfer Protocol (HTTP) GET Response message, and wherein the second response message carries the first bit which is received by the user device; and
    estimating the time elapsed between the user's first selection on the web browser in the user device under control of the user to the first bit received by the user device from the corresponding web server in accordance with the first delay parameter, the second delay parameter and the third delay parameter, wherein the time elapsed is estimated by adding the first delay parameter, twice the second delay parameter and the third delay parameter.

2. The method of claim 1, wherein the step of calculating the first delay parameter comprises:
    monitoring, by the network monitoring device, one network equipment in a network for receipt of the first request message corresponding to the user's first selection on the web browser;
    monitoring, by the network monitoring device, another network equipment in the network for receipt of the first response message, wherein the first response message is an acknowledgement message transmitted by the corresponding web server in response to receipt of the first request message;
    calculating, by the network monitoring device, the first delay parameter based upon time elapsed between detection of the first request message and the first response message.

3. The method of claim 1, wherein the step of calculating the second delay parameter comprises:
    monitoring, by the network monitoring device, the network equipment in the network for receipt of the second request message;
    calculating, by the network monitoring device, the second delay parameter based upon time elapsed between detection of the first response message and the second request message.

4. The method of claim 1, wherein the step of calculating the third delay parameter comprises:
    monitoring, by the network monitoring device, another network equipment in the network for receipt of the second response message;
    calculating, by the network monitoring device, the third delay parameter based upon time elapsed between detection of the second request message and the second response message.

5. The method of claim 1, further comprising:
    outputting, by the network monitoring device, to an external processing device the estimated time elapsed between the user's first selection on the web browser in the user device under control of the user to the first bit received by the user device from the corresponding web server.

6. A network monitoring device for estimating time elapsed between a user's first selection on a web browser in a user device under control of the user to a first bit received by the user device from a corresponding web server comprising:
    a datagram monitor configured to monitor at least two network devices in a network for detecting messages;
    a metrics calculator connected to the datagram monitor configured to:
        calculate a first delay parameter based upon time elapsed between detection of a first request message and a first response message, wherein the first request message corresponds to the user's first selection on the web browser, wherein the first request message corresponds to a transport control protocol (TCP) synchronization packet and the first response message is transmitted by the corresponding web server in response to the first request message received by the corresponding web server, wherein the first response message corresponds to an acknowledgement message at TCP layer transmitted by the corresponding web server in response to the first request message received by the corresponding web server;

calculate a second delay parameter based upon time elapsed between detection of the first response message and a second request message, wherein the second request message is transmitted by the user device in response to the first response message received by the user device, wherein the second request message corresponds to a Hypertext Transfer Protocol (HTTP) GET Request message;

calculate a third delay parameter based upon time elapsed between detections of the second request message and a second response message, wherein the second response message is transmitted by the corresponding web server in response to the second request message received by the corresponding web server, wherein the second response message corresponds to a Hypertext Transfer Protocol (HTTP) GET Response message, and wherein the second response message carries the first bit which is received by the user device; and estimate the time elapsed between the user's first selection on the web browser in the user device under control of the user to the first bit received by the user device from the corresponding web server in accordance with the first delay parameter, the second delay parameter and the third delay, wherein the time elapsed is estimated by adding the first delay parameter, twice the second delay parameter and the third delay parameter.

7. The network monitoring device of claim 6, wherein the datagram monitor is further configured to:
monitor one network equipment in a network for receipt of the first request message corresponding to the user's first selection on the web browser;
monitor another network equipment in the network for receipt of the first response message, wherein the first response message is an acknowledgement message transmitted by the corresponding web server in response to receipt of the request message, and wherein the metrics calculator is further configured to calculate the first delay parameter based upon time elapsed between detection of the first request message and the first response message.

8. The network monitoring device of claim 7, wherein the datagram monitor is further configured to:
monitor the network equipment in the network for receipt of the second request message; and
the metrics calculator is further configured to calculate the second delay parameter based upon time elapsed between detection of the first response message and the second request message.

9. The network monitoring device of claim 8, wherein: the datagram monitor is further configured to:
monitor the other network equipment in the network for receipt of the second response message; and wherein the metrics calculator is further configured to calculate the third delay parameter based upon time elapsed between detection of the second request message and the second response message.

10. The network monitoring device of claim 6, further comprising:
a metrics output connected to the metrics calculator and configured to output the estimated time elapsed between the user's first selection on the web browser in the user device under control of the user to the first bit received by the user device from the corresponding web server.

11. A method for estimating time elapsed between a user's first selection on a web browser in a user device under control of the user to a first bit received by the user device from a corresponding web server comprising:
monitoring, by a network monitoring device, one network equipment in a network for receipt of a first request message corresponding to the user's first selection on the web browser, wherein the first request message corresponds to a transport control protocol (TCP) synchronization packet;

monitoring, by the network monitoring device, another network equipment in the network for receipt of a first response message which is transmitted by the corresponding web server in response to the first request message, wherein the first response message corresponds to an acknowledgement message at TCP layer transmitted by the corresponding web server in response to the first request message received by the corresponding web server;

monitoring, by the network monitoring device, the network equipment in the network for receipt of a second request message, wherein the second response message is transmitted by the user device in response to receipt of the first response message, wherein the second request message corresponds to a Hypertext Transfer Protocol (HTTP) GET Request message;

monitoring, by the network monitoring device, the another network equipment in the network for receipt of a second response message which is transmitted by the corresponding web server in response to the second request message, wherein the second response message corresponds to a Hypertext Transfer Protocol (HTTP) GET Response message, and wherein the second response message carries the first bit which is received by the user device;

calculating, by a network monitoring device, a first delay parameter D1, wherein the first delay parameter D1 is time elapsed between detections of the first request message and the first response message;

calculating, by the network monitoring device, a second delay parameter D2, wherein the second delay parameter D2 is time elapsed between detections of the first response message and the second request message;

calculating, by the network monitoring device, a third delay parameter D3, wherein the third delay parameter D3 is time elapsed between detections of the second request message and the second request message; and estimating the time, D5, elapsed between the user's first selection on the web browser in the user device under control of the user to the first bit received by the user device from the corresponding web server according to an expression (1):

$$D5 = D1 + D2 \times 2 + D3 \qquad \text{expression (1)}.$$

* * * * *